Patented Feb. 22, 1938

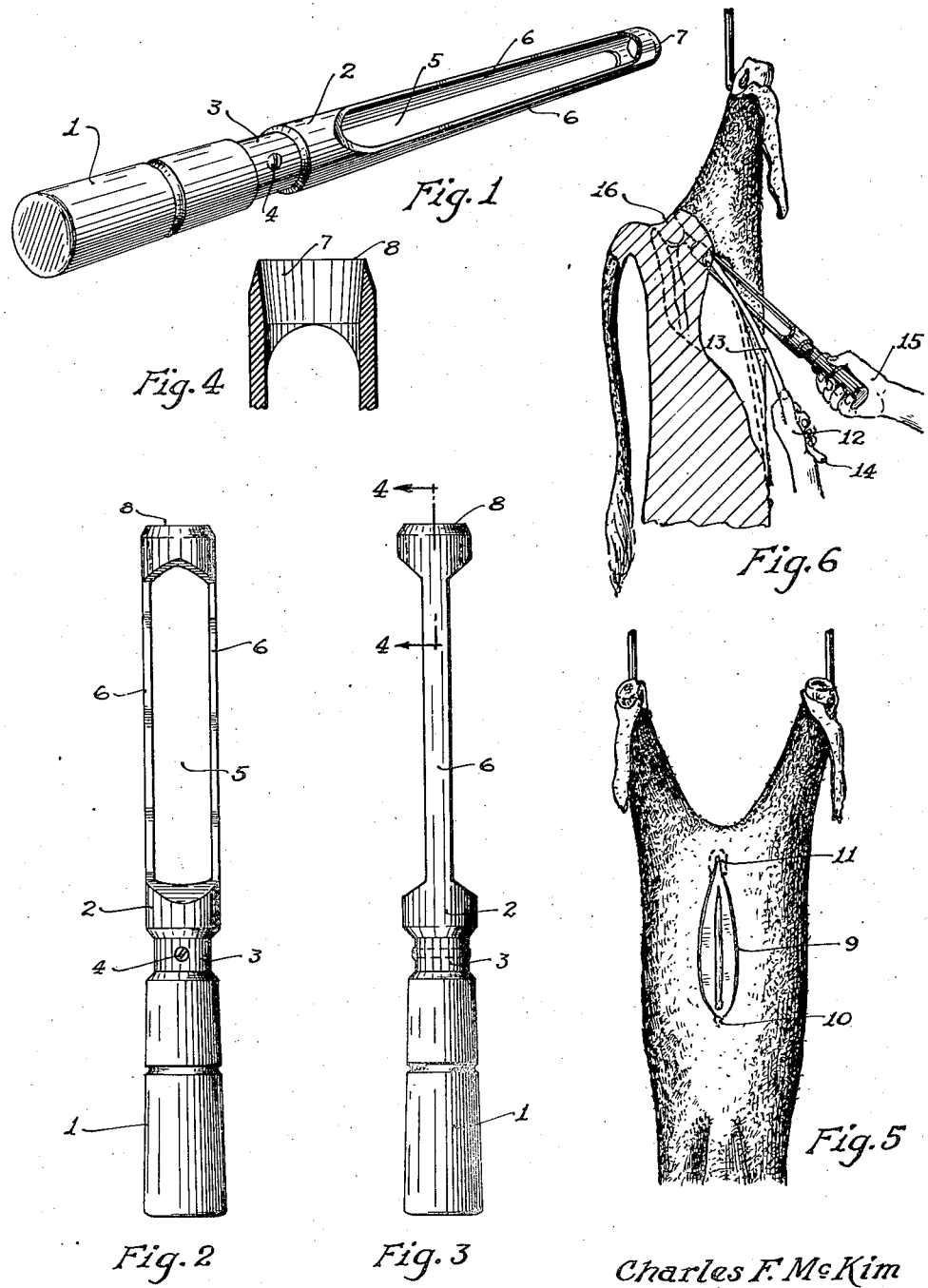

2,108,921

UNITED STATES PATENT OFFICE 2,108,921

PIZZLE REMOVAL METHOD

Charles F. McKim, Chicago, Ill., assignor to Industrial Patents Corporation, Chicago, Ill., a corporation of Delaware Application December 16, 1936, Serial No. 116,206

4 Claims. (Cl. 17—1)

This invention relates to the dressing of animal carcasses.

One of the objects of the invention is to provide a method for removing the pizzle cord in calves.

Other objects of the invention will be apparent from the description and claims which follow.

The customary method of dressing calves involves carrying the incision in the belly completely through the crotch to the bung opening. It is desirable in dressing hide-on calves to leave the crotch closed and the crotch skin intact. This renders difficult the removal of the pizzle cord in male animals. In dressing calves with the crotch closed, the procedure is to first stick the animal and permit it to bleed. The right hind leg is then skinned out up to the hock and hung up on a trolly hook. The carcass passes down the rail and the other hind leg is skinned out and hung on a trolly hook. The head is then skinned out and cut off and the carcass washed. At the next station the bung is dropped.

In carrying out the method of the present invention, an incision is made from the navel to the scrotum, which incision in the ordinary calf exposes the end and about sixteen inches of the pizzle cord, which normally has a complete length of from twenty to twenty-five inches, terminating at its base at the bladder.

The method of the present invention may be readily understood by reference to the drawing.

Figure 1 is a perspective view illustrating one form of a tool which may be employed in the method of the present invention.

Figure 2 is a side view of the tool shown in Figure 1.

Figure 3 is another side view.

Figure 4 is a detail in cross section of the cutting edge of the tool.

Figure 5 is a perspective view showing the incision in a calf carcass from which the pizzle cord is about to be removed.

Figure 6 is a perspective view, partly in section, showing the manner of removal of the pizzle cord.

It will be seen by reference to Figure 1 that the tool comprises a handle 1, to which the shank 2 provided with collar portion 3 is affixed as by means of screw 4. The shank 2 is a hollow metal cylinder having two relatively large openings 5 defined by sides 6. The open end 7 is provided with circular cutting edge 8.

Figure 5 illustrates a calf carcass which has been prepared for removal of the pizzle cord. It will be noted that incision 9 exposes the underlying tissue from navel 10 to scrotum 11. The manner of removing the pizzle cord may be understood by reference to Figure 6 in which the left hand 12 of an operator is shown grasping pizzle 13. The end 14 of pizzle 13 is first threaded through opening 7 and drawn through one of the side openings 5. It is then seized as shown in Figure 6. The right hand 15 of the operator grasps the handle 1 and forces the cutting edge 8 through the tissue of the carcass back to the bung opening 16. In manipulating the tool, it is rotated back and forth through an arc as it is being pushed under the skin through the tissue until the cutting edge of the tool emerges in the bung hole opening. The combined pushing and rotating action causes the sharp edge of the tool to cut the fell around the pizzle, resulting in complete removal of the pizzle from the carcass by coring it out.

I claim:

1. The method of removing pizzle cords from calves which comprises exposing the end portion of the pizzle between the navel and the scrotum and removing the pizzle cord in its entirety by coring out the base portion of the pizzle between the scrotum and the bladder.

2. In dressing calves, the steps involving the removal of the pizzle cord which comprise exposing the end portion of the pizzle between the navel and the scrotum and coring out the base portion of the pizzle.

3. In dressing calves with a closed crotch, the steps comprising forming a bung opening by dropping the bung, exposing the end of the pizzle cord between the navel and the scrotum, cutting the fell around the base portion of the pizzle from the scrotum to the bung opening, and removing the pizzle in its entirety.

4. In dressing animal carcasses, the steps involving the removal of the pizzle which comprise coring out the base portion of the pizzle.

CHARLES F. McKIM.